United States Patent
Bradley

(10) Patent No.: US 9,629,472 B1
(45) Date of Patent: Apr. 25, 2017

(54) SLEEPING BED FOUNDATION STRUCTURE

(71) Applicant: Bill Bradley, Johnson City, TN (US)

(72) Inventor: Bill Bradley, Johnson City, TN (US)

( * ) Notice: Subject to any disclaimer, the term of this patent is extended or adjusted under 35 U.S.C. 154(b) by 545 days.

(21) Appl. No.: 13/998,752

(22) Filed: Dec. 3, 2013

(51) Int. Cl.
*A47C 19/02* (2006.01)
*F16B 12/10* (2006.01)

(52) U.S. Cl.
CPC ............ *A47C 19/025* (2013.01); *A47C 19/02* (2013.01); *A47C 19/021* (2013.01); *F16B 2012/106* (2013.01)

(58) Field of Classification Search
CPC ....... A47C 19/00; A47C 19/02; A47C 19/021; A47C 19/025; F16B 2/02; F16B 7/04; F16B 12/40; F16B 12/20; F16B 12/22; F16B 12/14; F16B 2012/145; F16B 11/00; Y10T 403/553; Y10T 403/7018; Y10T 403/7062
See application file for complete search history.

(56) References Cited

U.S. PATENT DOCUMENTS

| | | | | |
|---|---|---|---|---|
| 561,684 A | * | 6/1896 | Mueller | A47C 19/025 5/196 |
| 1,504,807 A | * | 8/1924 | Brotherton, Jr. | A47C 19/025 16/260 |
| 2,304,511 A | * | 12/1942 | Skinner | A47C 19/025 5/238 |
| 4,870,711 A | * | 10/1989 | Felix | A47C 19/005 403/205 |
| 4,981,388 A | * | 1/1991 | Becken | E04B 1/2604 403/258 |
| 5,647,174 A | * | 7/1997 | Mattarelli | E04F 19/005 126/500 |
| 5,961,243 A | * | 10/1999 | Michaluk, III | A47B 47/00 211/182 |
| 6,625,827 B1 | * | 9/2003 | Polevoy | A47C 19/02 5/201 |
| 2005/0217027 A1 | * | 10/2005 | Polevoy | A47C 19/005 5/201 |
| 2008/0208709 A1 | * | 8/2008 | Craver | A47C 19/005 705/26.8 |
| 2010/0242171 A1 | * | 9/2010 | Polevoy | A47C 19/025 5/282.1 |

FOREIGN PATENT DOCUMENTS

GB 2295539 A * 6/1996 .......... A47C 19/021

* cited by examiner

*Primary Examiner* — David E Sosnowski
*Assistant Examiner* — Amanda L Miller

(57) ABSTRACT

A rectangular, preferably wooden bed foundation, a plurality of mattress support slats extending between two opposing side sections wherein the end portions of said slats are inserted into pocket recesses formed laterally into the inner sides of the two opposing side sections, wherein a selected number of slat end portions are fastened into pocket recesses by means of bolt and nut combinations wherein the bolts are mounted through passages formed laterally through the side sections and extend horizontally into the pocket recesses, wherein the nuts are imbedded in the aperture wells, whereby upon tightening of the bolts the slat ends are drawn tightly into the pocket recesses to thereby strengthen and rigidify the bed foundation.

6 Claims, 5 Drawing Sheets

SLEEPING BED FOUNDATION STRUCTURE

BACKGROUND OF THE INVENTION

Field

This invention is in the field of bed foundations or assembleable bed frame constructions and particularly is directed to a unique structure and assembly method for putting together very strong, lightweight and attractive foundations (frames) for a wide size and style selection of bed mattresses.

Prior Art

Heretofore bed frames typically employ side boards which are connected at their ends to head and foot boards wherein longitudinally running ledge strips are fastened to the insides of the side boards for loosely supporting lateral cross slats on which the mattress is laid. This type of construction does not provide a highly stable framework in that the sideboards and slats are not typically connected, i.e., are not strongly fastened together. Such prior structure allows sideways forces on the sideboards to sometimes dislodge the slats from the sideboards and drop the mattress and its unwary occupant on the floor. Further such prior construction does not stabilize the outer framework of sideboards, headboard and footboard from rotative twisting in a horizontal plane and also in a vertical plane which often leads to intolerable squeaking noise and sometimes displacement of the lateral support slats which can lead to the aforementioned bed collapse.

SUMMARY OF THE INVENTION

The present invention provides insurance against the aforementioned crises situations through the unique structure, which in one preferred embodiment comprises four side sections connected at their ends to form a rectangular, preferably wooden bed foundation, a plurality of mattress support slats extending between two opposing side sections wherein the end portions of said slats are inserted into pocket recesses formed laterally into the inner sides of the two opposing side sections, wherein a selected number of slat end portions are fastened into pocket recesses by means of bolt and nut combinations wherein the bolts are mounted through passages formed laterally through the side sections and extend horizontally into the pocket recesses, wherein the nuts are imbedded in the aperture wells, whereby upon tightening of the bolts the slat ends are drawn tightly into the pocket recesses to thereby strengthen and rigidify the bed foundation.

BRIEF DESCRIPTION OF THE DRAWINGS

The invention will be further understood from the following drawings and their description wherein some figures are not drawn to the same proportions and wherein:

FIG. 3 is a view as in FIG. 1 of the assembled foundation and showing positioning of the mattress, inner spring unit or the like;

DETAILED DESCRIPTION

Figure 1:
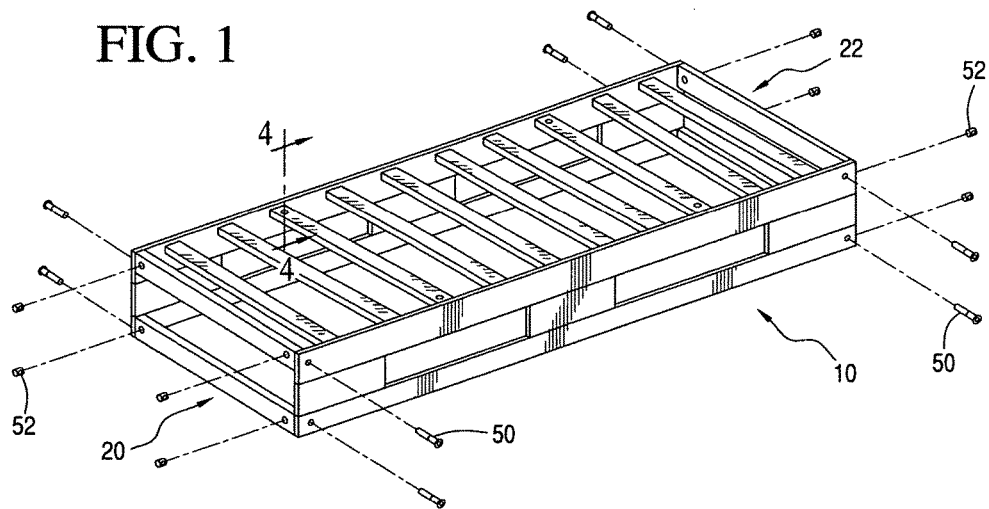
FIG. 1 is a perspective view of an embodiment of the present bed foundation or frame with the slats in place and showing the direction and placement of insertion of the bolts and nuts.

Referring to the drawings, one embodiment of the present rectangular, preferably wooden bed foundation 10 is comprised of opposing, horizontal (in use) longitudinally extending side sections 12, 14 connected at each of their ends 16, 18 to laterally extending end sections 20, 22, each section having a thickness dimension 24 and a side width dimension 26 and having a generally rectangular cross-section 28. A plurality of mattress support slats 30 extend between the side sections wherein the end portions 32 of the slats are inserted into pocket recesses 34 formed laterally into the inner sides 36 of the side sections. These pocket recesses have top 38, bottom 40, side 42, 44 and inner 46 end walls and are longitudinally spaced from each other along the side sections and lie in a horizontal plane 48, wherein each slat end portion 32 is fastened into a pocket recess by means of a bolt 50 and nut 52 connector combination wherein the bolt head 51 is provided with a tightening shoulder means such as an allen wrench keyway 53. The bolt is mounted through a passage 54 formed laterally through the side section and extending horizontally into the pocket recess through said inner end wall 46, wherein the nut is imbedded in an aperture well 56 formed and extending vertically through an upper portion 58 of the side section and vertically through the pocket recess 34 and into a lower portion 60 of the side section adjacent to and below the passage 54. This structure provides nut displacement stop shoulders 62, 64 above and below the slot respectively, wherein the horizontal axis 66 of the threaded bore 68 of the nut is aligned with the axis 70 of the passage 54 and the axis 72 of the bolt. A vertical axis 74 of the aperture well 56 is thus aligned with a vertical axis 76 of the nut, wherein the bottom 78 of the nut rests and is positioned on the side surface 80 at the bottom of the aperture well, wherein the nut extends through each end portion of each slat from the top side to the bottom side of the slat and which engages the stop shoulders on the side portions of the aperture. The bolt is threaded through the bore, wherein the side portions of the nut bear against the stops shoulders with increasing force as the bolt is threaded further through the nut bore whereby the end portions of the slats are drawn further into the pocket recesses until they are locked tightly in position against the inner end wall of the pocket recesses to thereby rigidify the foundation structure.

Figure 2:
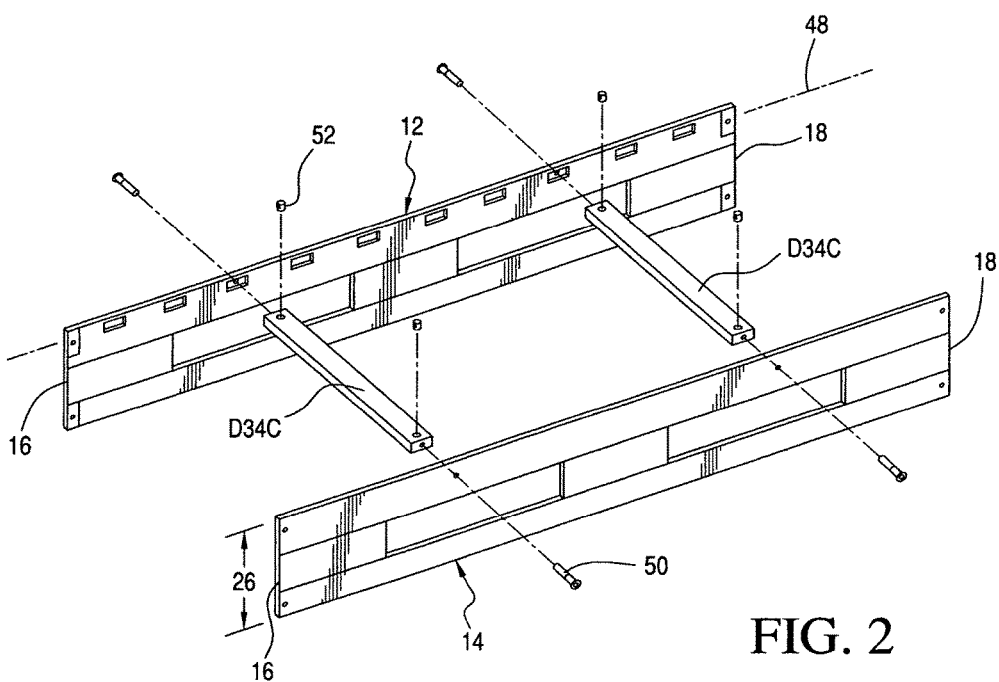
FIG. 2 is a perspective view of an assembly step for attachment of the slats for FIG. 1.
Figure 3:
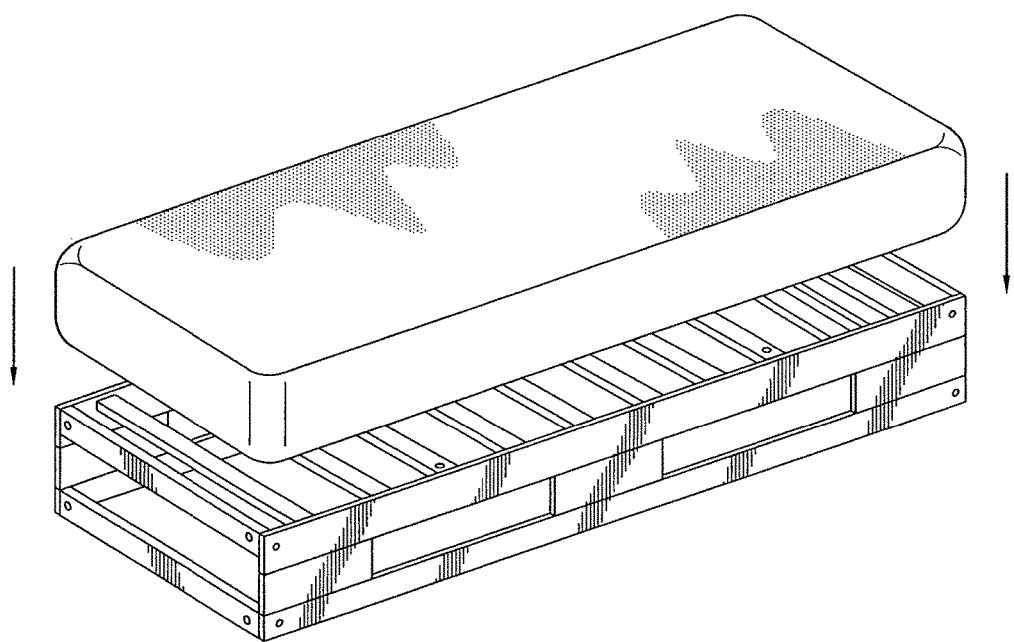
Figure 4:
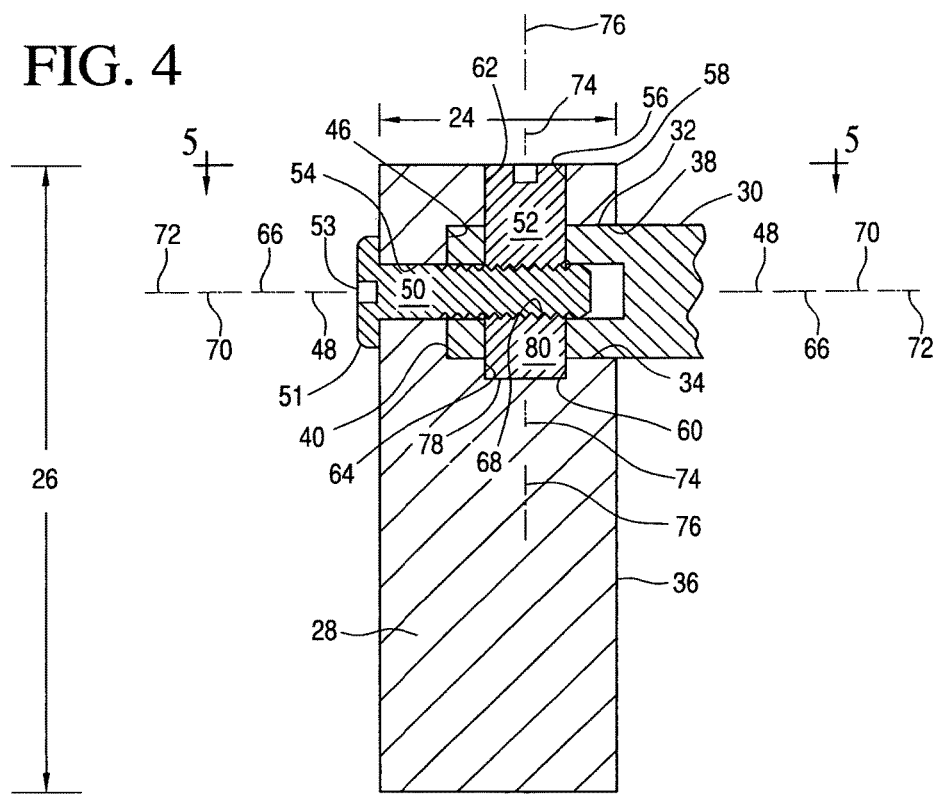
FIG. 4 is a cross-sectional detailed view of the bolt-nut connection combination of an inserted slat end and a side section.
Figure 6:
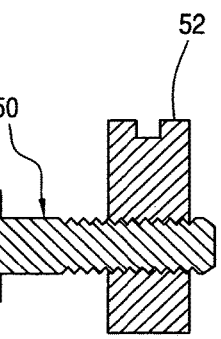
FIG. 6 is an enlarged cross-sectional view of the bolt and nut area of FIG. 4 showing the axes (recited in the claims herein) of the various components.
Figure 5:
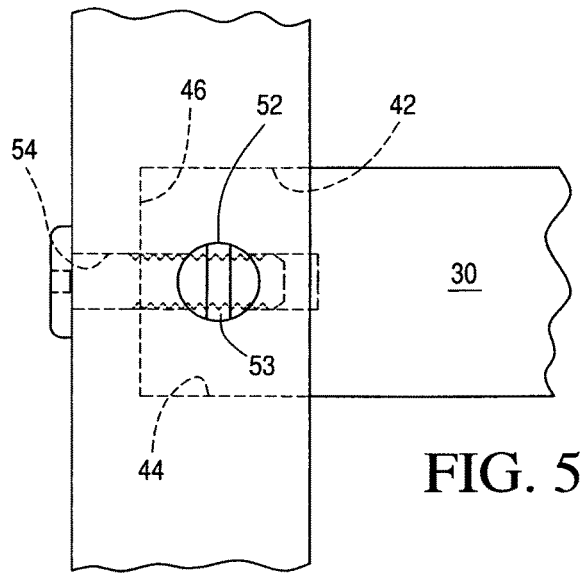
FIG. 5 is a top down view of the connection area of FIG. 4 taken along line 5-5 in FIG. 4.
Figure 7:
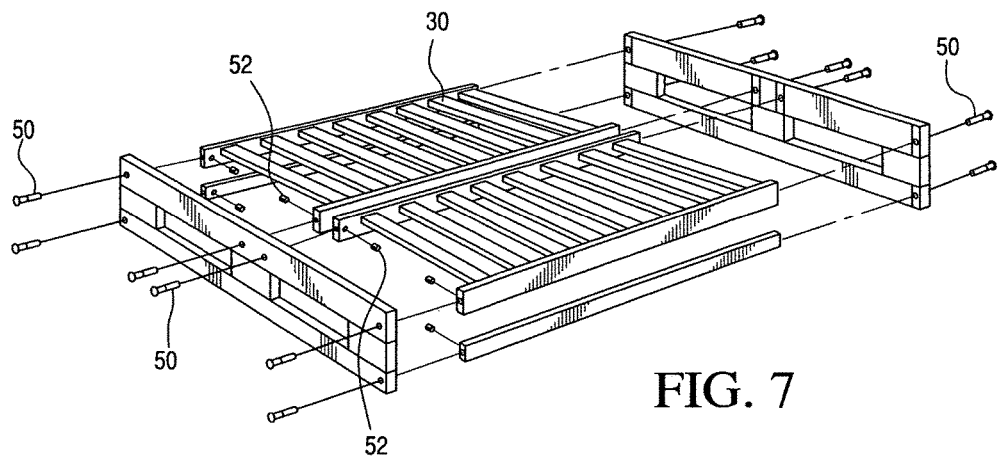
FIG. 7 shows an unassembled variation of the bed foundation for accommodation of large, e.g., Queen and King size mattresses.
Figure 8:
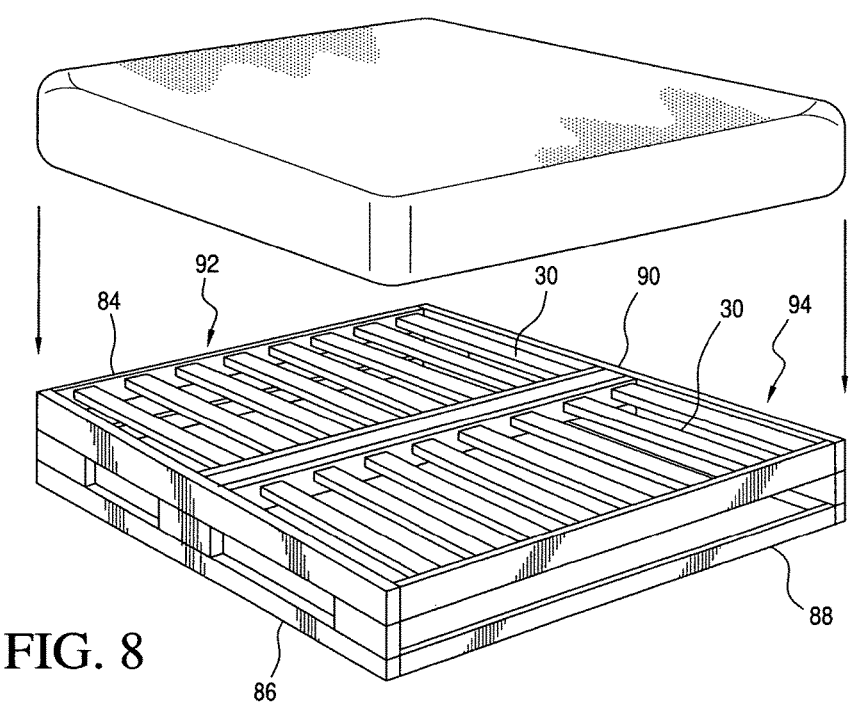
FIG. 8 shows an assembled foundation of FIG. 7.
Figure 9:
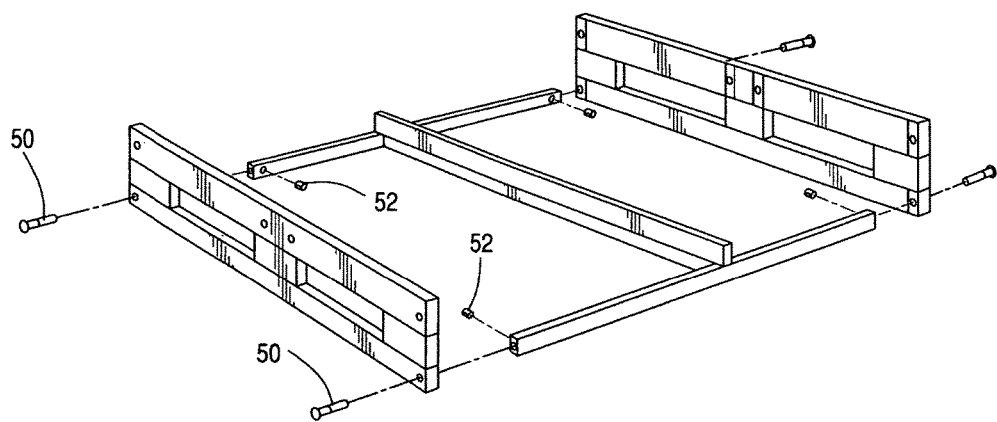
FIG. 9 shows the use of a center support member for the larger structures such as shown in FIGS. 7 and 8.

Referring to FIGS. 7, 8, 9 in which is shown an enlarged foundation framework of four sides 84, 86, 88, 90 for supporting large mattresses, the slats 30 are mounted in two side by side banks 92, 94 of slats which are oriented laterally of the lengthwise dimension of the frame as compared to their orientation in FIGS. 1-3. The manner of connection however of the various members by means of the bolt and nut combination described above is the same. It is noted that the bolt and nut combination can be used also for connecting together the frame members, sides, end sections, center support, etc., as shown in the drawings. Also, a selected number of slats, i.e., less than all slats, e.g., 2-6 slats can be connected into the side sections by the bolt-nut combination to give the rigidity required. However, most preferably at least two slats should be so connected to the side sections to accomplish the desired objective.

The invention has been described in detail with particular reference to preferred embodiments thereof, but it will be understood that variations and modifications will be effected with the spirit and scope of the invention.

I claim:

1. A bed foundation having a rectangular configuration comprising: two opposing elongated side rail structures,
   wherein each side rail structure has a longitudinal axis, is substantially rectangular in cross section and has vertical inner and outer sides, top and bottom horizontal edges, opposing head end and foot end portions, and a slat supporting intermediate section extending between said head and foot end portions,
   wherein each said intermediate section has a plurality of rectangular in cross-section pocket recesses formed into said inner side at longitudinally spaced locations along said intermediate section wherein each pocket recess has a horizontal top wall, a horizontal bottom wall, opposing vertical side edge walls, an inner wall, and a lateral axis and wherein each side rail has a plurality of passages formed laterally through said intermediate section,
   wherein said head and foot end portions of each said side rail structure are connected respectively to end portions of a head board structure and a foot board structure, wherein said inner sides of said rail structures face toward each other;
   a plurality of elongated bed slats each having rectangular in cross-section end mounting portions which allow a sliding fit of said end mounting portions into said pocket recesses, wherein each said end mounting portion is positioned in said pocket recesses;
   a plurality of nut wells, wherein each nut well of said plurality of nut wells is formed vertically down through an associated one of said top horizontal edges, is associated with and extends vertically downward through an associated pocket recess of said plurality of pocket recesses and through one of the end mounting portions of an associated slat of the plurality of slats and further down into the bottom wall of the associated pocket recess to provide top and bottom stop shoulders on each nut well;
   a plurality of nuts each having a threaded bolt receiving bore, wherein each nut is positioned in an associated nut well of said plurality of nut wells; and
   a plurality of bolts each having a longitudinal axis, wherein each bolt of the plurality of bolts is mounted through a corresponding passage of said plurality of passages from said outer side through said inner wall of a corresponding pocket recess of said plurality of pocket recesses and into said corresponding pocket recess and further into one of the end mounting portions of an associated slat of the plurality of slats positioned in said corresponding pocket recess substantially along said lateral axis of said corresponding pocket recess, wherein said bolts extend horizontally through said inner walls of said pocket recesses and through said threaded bolt bores of said nuts, whereby upon tightening of said bolts said slat mounting ends are drawn into said pocket recesses toward said inner walls of said pocket recesses to thereby strengthen and rigidify said bed foundation.

2. The bed foundation of claim 1 wherein each of said plurality of nuts has an elongated body having a cylindrical cross-section configuration with an axis of rotation and with a threaded bolt bore formed laterally through said body, wherein a top portion of each said body is provided with a shoulder structure for being engaged by a tool for rotating said nut about said axis of rotation for aligning said threaded bolt bore with said longitudinal axis of said bolt.

3. The bed foundation of claim 1 wherein each said side rail structure is constructed of two parallel, longitudinally extending horizontal side members which are vertically spaced apart by longitudinally spaced spanner members, which members have a selected vertical dimension to give a desired height to said foundation, and wherein said head board structure and said foot board structure are each constructed of two parallel laterally extending horizontal members which are vertically spaced apart from each other the same vertical dimension as said horizontal side members are spaced apart from each other.

4. The bed foundation of claim 1 wherein portions of said inner sides of each said side rail structure, which portions lie in a plane above said top walls of said pocket recesses, provide a stop shoulder for limiting lateral movement of a mattress positioned on said slats.

5. The bed foundation of claim 1 wherein a center longitudinally extending slat support rail structure is provided and having two spaced and parallel center rails, each said center rail having vertical inner facing and outer facing vertical sides, opposing head and foot ends and an intermediate section between said head and foot ends,
   wherein said head and foot ends of each said center rail are connected respectively to laterally positioned central portions of said head board member and of said foot board member,
   wherein each said vertical side of each said intermediate section of each said center rail is provided with said longitudinally spaced pocket recesses to provide side-by-side slat support banks,
   wherein said mounting ends of a desired number of the plurality of elongated bed slats are positioned in said pocket recesses of said side-by-side slat support banks.

6. The bed foundation of claim 4 wherein a mattress is positioned on said slats with side edge portions of said mattress lying adjacent said stop shoulder.

* * * * *